United States Patent
McGeehan

(10) Patent No.: US 9,325,731 B2
(45) Date of Patent: Apr. 26, 2016

(54) IDENTIFICATION OF AND COUNTERMEASURES AGAINST FORGED WEBSITES

(75) Inventor: Ryan McGeehan, Palo Alto, CA (US)

(73) Assignee: Facebook, Inc., Menlo Park, CA (US)

( * ) Notice: Subject to any disclaimer, the term of this patent is extended or adjusted under 35 U.S.C. 154(b) by 1506 days.

(21) Appl. No.: 12/043,130

(22) Filed: Mar. 5, 2008

(65) Prior Publication Data

US 2009/0228780 A1    Sep. 10, 2009

(51) Int. Cl.
| G06F 21/64 | (2013.01) |
| H04N 21/83 | (2011.01) |
| H04L 29/06 | (2006.01) |
| G06F 21/55 | (2013.01) |

(52) U.S. Cl.
CPC ............ H04L 63/1441 (2013.01); G06F 21/55 (2013.01); H04L 63/1483 (2013.01); H04L 63/1491 (2013.01)

(58) Field of Classification Search
CPC .......... H04N 1/00856; H04N 1/32144; H04N 1/00883; H04N 1/00864; H04N 1/00843; H04N 1/00838; H04N 1/00848; H04N 1/00867; H04N 2201/3269; H04N 1/00872; G06F 21/121; G06F 21/64; G06F 21/60; G06F 21/6245; G06F 21/12; G06F 21/125; G06F 21/31; G06F 21/88; G06F 2221/2143; G06F 8/751
USPC ................ 715/234; 726/4, 7, 23, 32; 399/366
See application file for complete search history.

(56) References Cited

U.S. PATENT DOCUMENTS

| 7,584,255 | B1 * | 9/2009 | Hogeboom ............. H04L 12/58 709/206 |
| 7,698,442 | B1 * | 4/2010 | Krishnamurthy et al. .... 709/229 |
| 7,830,537 | B2 * | 11/2010 | Beadle ............... H04N 1/00843 358/1.14 |
| 8,423,471 | B1 * | 4/2013 | Emigh ................ G06F 21/6227 705/50 |
| 8,578,482 | B1 * | 11/2013 | Yang ....................... G06F 21/00 726/22 |
| 2003/0046578 | A1 * | 3/2003 | Brown .................... G06F 21/10 726/6 |
| 2004/0030784 | A1 * | 2/2004 | Abdulhayoglu .. G06F 17/30861 709/227 |
| 2004/0078422 | A1 * | 4/2004 | Toomey ............. G06F 21/6218 709/202 |
| 2006/0095955 | A1 * | 5/2006 | Vong ................................ 726/3 |
| 2006/0277605 | A1 * | 12/2006 | Curtis ..................... G06F 21/57 726/24 |
| 2007/0118528 | A1 * | 5/2007 | Choi et al. ........................ 707/9 |
| 2007/0192853 | A1 * | 8/2007 | Shraim ................ G06Q 10/107 726/22 |
| 2007/0299857 | A1 * | 12/2007 | Gwozdz ............ G06F 17/30899 |
| 2008/0025497 | A1 * | 1/2008 | Ogram .................. H04L 9/0838 380/28 |
| 2008/0046738 | A1 * | 2/2008 | Galloway ............ H04L 63/1416 713/176 |

(Continued)

OTHER PUBLICATIONS

McRae et al. (Phighting the Phisher: Using Web Bugs and Honeytokens to Investigate the Source of Phishing Attacks), Proceedings of the 40th Hawaii International Conference on System Sciences—2007, pp. 1-7.*

(Continued)

*Primary Examiner* — Stephen Hong
*Assistant Examiner* — Ahamed I Nazar
(74) *Attorney, Agent, or Firm* — Fenwick & West LLP

(57) ABSTRACT

A system, a method, and computer program product identify a website that is a forgery of a primary website. Client side executable code is included in a page of the primary website, which page is copied in the forged website. The client side code, when executed by a client device, determines whether the domain from which the page is served is an authorized domain. Where the serving domain is not authorized, the client device is configured to alter the execute countermeasures against the forged website, such as altering operation of the forged page.

21 Claims, 4 Drawing Sheets

(56) References Cited

U.S. PATENT DOCUMENTS

| | | | |
|---|---|---|---|
| 2008/0052359 A1* | 2/2008 | Golan | G06Q 10/107 709/206 |
| 2008/0066163 A1* | 3/2008 | Raheman | H04L 63/0869 726/4 |
| 2008/0276306 A1* | 11/2008 | Fifer et al. | 726/5 |
| 2008/0313732 A1* | 12/2008 | Pierce | 726/22 |
| 2009/0100505 A1* | 4/2009 | Shaty | G06F 21/50 726/3 |
| 2009/0217301 A1* | 8/2009 | Grant | G06F 21/31 719/320 |

OTHER PUBLICATIONS

PCT International Search Report and Written Opinion, PCT/US2009/035016, Apr. 3, 2009, 8 Pages.

* cited by examiner

IDENTIFICATION OF AND COUNTERMEASURES AGAINST FORGED WEBSITES

FIELD OF THE INVENTION

The present invention relates identifying forged websites and taking countermeasures against such forgeries.

BACKGROUND OF THE INVENTION

Phishing is the attempt to obtain confidential information from users, such as user names, passwords, account numbers and the like, by pretending to be a legitimate online entity. One form of phishing is website forgery. A site forger duplicates or "spoofs" a target website, typically by copying target website's home page, and typically hosts that page in another domain with a very similar name. A forged website is also known as a spoofed or phished website. For example, a target site for a social network may be hosted at "www.thesocial-network.com", with a home page that includes fields for users to login into their accounts by providing their user name and password. A site forger would copy the code home page of the bank and host it, for example at "www.the-social-network.com". A user may be directed to the forged website from hyperlinks found in emails, blogs, and so forth. A user clicking on the hyperlink may not realize they are being directed to the forged site, and thereby inadvertently provide their user credentials (e.g., username and account password) to the site forger. With the users' credentials, the site forger than can access these users' accounts on the target website, for example to send advertisements, steal personal information, or undertake other malicious activities.

Existing methods for dealing with website forgery generally rely on the monitoring incoming requests for images and other resources, by reviewing the web server log files for such requests. When a website forger copies the home page of the target site, the images in that home page remain sourced at the target site. Thus, when the forged site is loaded by the user's browser, it requests those images from the target site. The log files indicate the domain from which these images are being requested. Since the images can be requested from other domains for legitimate reasons, a forged site is identified by including a web beacon image, e.g., an image of a single pixel, in the home page of the target site. Only a site forger is likely to copy the web beacon image (as a result of copying the entirety of the home page). Thus requests from other domains for the web beacon image may be indicative of a forged site. This method of identifying a forged site is easily defeated by the site forger however, by simply copying and hosting the entire target page, including all of the image files on their own server. In this situation there is no evidence in the target site's log files of the requests from the forged site.

This and other methods of identifying forged sites all depend on identifying a pattern of authorized accesses to the target site. By the time the forged site is identified, significant damage may have already been inflicted by the site forger on the users' accounts and the target site. In particular, existing methods are incapable of identifying and preventing the first time a forged site attempts an attack on a target site.

SUMMARY OF THE INVENTION

The present invention provides a methodology and system for identifying a forged website. The present invention also provides a methodology and system to prevent a forged website from obtaining user credentials.

In one embodiment, client-side executable code is embedded in a page of a primary website that is to be protected from a website forger. The code includes domain identification code that is executed by the client device when client device loads the page, whether from the primary website which is in an authorized network domain, or from a forged website which is an unauthorized network domain. The site forger will copy the domain identification code as part that is copied in the forged website.

When the client device accesses the forged website, it loads the copied page, along with the domain identification code, which it executes. The client device then determines the network domain from which the page is hosted. If the network domain is not an authorized network domain for hosting the page, the client device transmits an identification of the unauthorized network domain to an authorized server, such as one executing at the primary website. This identifies the forged website to the authorized server. The system operator of the primary website can then query a domain register and identify the website forger. If the network domain is an authorized domain, the client device need not take another action.

Once the client device has identified the forged website, it can execute additional client-side countermeasures code. This countermeasures code can be configured to modify the appearance and/or functionality of the page at the forged website. For example, the countermeasures code can alter the appearance of the page by blanking out the page (in whole or in part), by rendering the page unreadable (in whole or in part), or by displaying a warning to the user on the page. The countermeasures code may alter the functionality of the page by blocking data entry into user credential data fields, such as the username and password fields, thereby preventing the site forger from obtaining these credentials. The countermeasures code can also alter the functionality of the page by providing fake user credentials to the page, thereby providing the site forger with useless information. In addition to providing the fake credentials, a corresponding fake account can be established on the primary website, so as to receive from the site forger any spam email, advertisements, or other inappropriate content. The countermeasures code can be provided to the client device from the primary website or it can be included in the page in conjunction with the domain identification code.

The features and advantages described in this summary and the following detailed description are not all-inclusive. Many additional features and advantages will be apparent to one of ordinary skill in the art in view of the drawings, specification, and claims hereof.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION OF THE INVENTION

Figure 1:
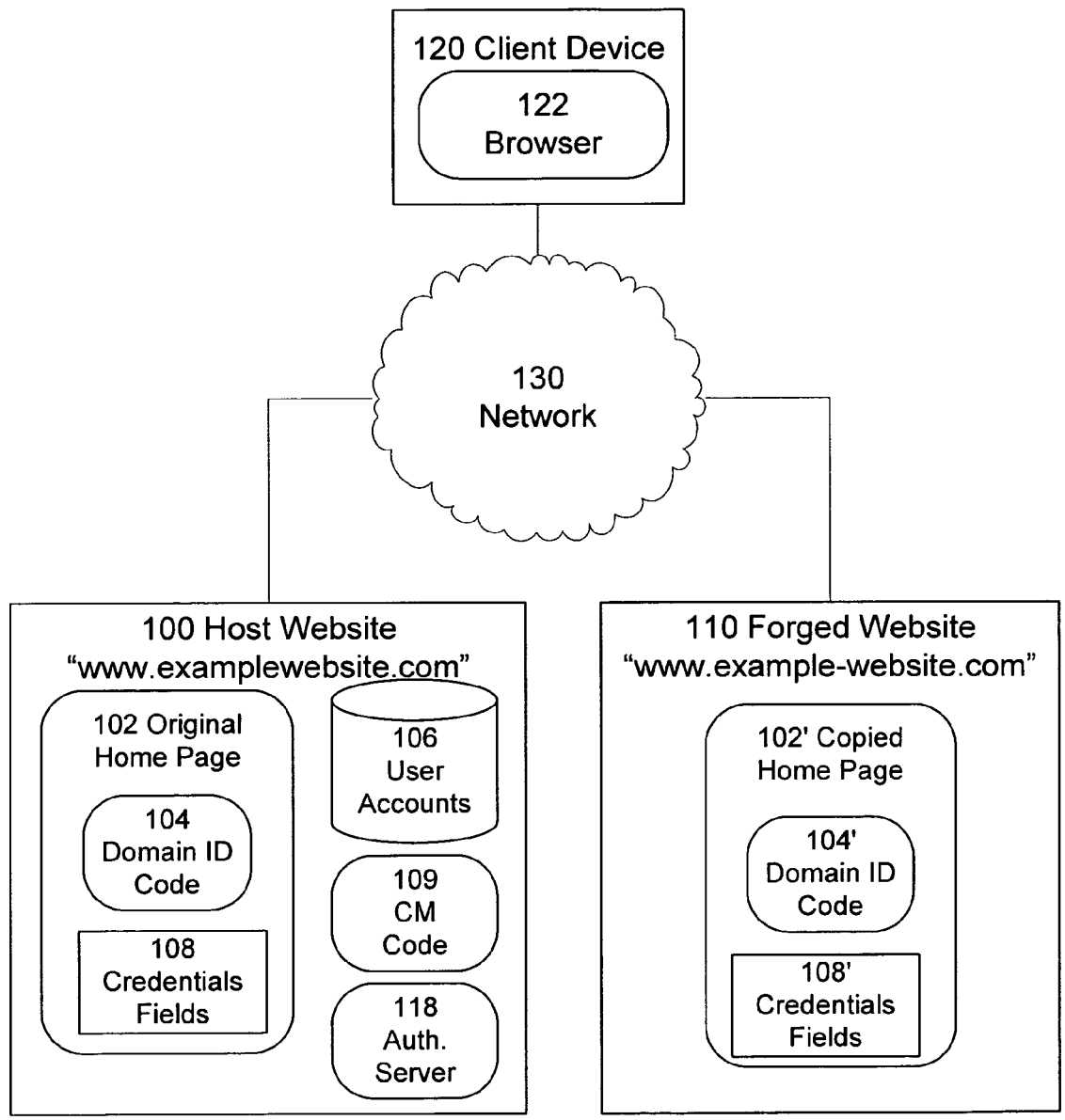
FIG. 1 is block diagram an operating environment supporting an embodiment of the invention.

Referring now to FIG. 1, there is shown an operating environment of an embodiment of for the operation of a computer system (the primary website 100) in accordance with one embodiment of present invention. The environment comprises the primary website 100, a network 130, one or more client devices 120, and a forged website 110.

The primary website 100 can be any website, suitable for any purpose, such as e-commerce, social networking, information publisher (e.g., news, commentary, blog), or the like; the invention imposes no limit on the type of website 100 to which it can be applied. The website may, but need not, have a repository of user accounts 106, such as database, file system, or other like. Where user accounts are provided, each user will typically have a set of credentials for gaining access to some of the functionality of the website 100. When a user has an account on the website, the user can be referred to as a member of the site. That is, it is common for websites 100 to have some functionality and content available to all users, including both members and non-members, and other functionality and content available only to members.

The primary website 100 will typically have a home page 102 or other landing page which provides one page through which users access the website. The website 100 will have other pages as well, and may support various applications, content, and services. The various pages of the primary website 100, as well as the applications, content and so forth, are stored in computer storage devices, such as hard drives and/or memories, and access via systems such as file systems, database management systems, or the like. The home page 102 will typically have data entry fields 108 for receiving user credentials for logging into the website 100; the location of the credential data entry fields 108 on the website 100 is not material, and indeed the data entry fields 108 can appear on pages other than the home page 102. The credentials can be any data such as username, password, account number, PIN, email address, telephone number, and the like.

The primary website 100 is hosted on one or more web servers (not shown), along with associated devices, such as firewalls, network interfaces, load balancers, database servers, and the like. Each of the various servers is implemented as server program executing on server-class computer comprising a CPU, memory, network interface, peripheral interfaces, and other well known components. The computers themselves preferably run an open-source operating system such as LINUX, have generally high performance CPUs, 1 G or more of memory, and 100 G or more of disk storage. Of course, other types of computers can be used, and it is expected that as more powerful computers are developed in the future, they can be configured in accordance with the teachings here. The functionality implemented by any of the elements can be provided from computer program products that are stored in tangible computer accessible storage mediums (e.g., RAM, hard disk, or optical/magnetic media). It will be understood that the term "website" represents any computer system adapted to serve content using any internetworking protocols, and is not intended to be limited to content uploaded or downloaded via the Internet or the HTTP protocol.

The primary website 100 will be hosted by one or more web servers at respective IP addresses on the network 130. These IP addresses will be associated with an authorized domain name for the website 100. For example, the primary website 100 may be associated at the domain "www.examplewebsite.com", where "examplewebsite" is the authorized domain name.

The client device 120 is any computing device adapted to access the primary website 100 using its supported networking protocols. Without limitation, a client device 120 can be a personal computer, smartphone, cellular phone, set-top receiver, or the like. The client device 120 executes a browser 122 application to access the primary website 100 via the network 130, which is typically the Internet, but may also be any network, including but not limited to a LAN, a MAN, a WAN, a mobile, wired or wireless network, a private network, or a virtual private network, and any combination thereof. While only a single client 120 and browser 122 are shown, it is understood that very large numbers (e.g., millions) of clients are supported and can be in communication with the website 100 at any time.

The forged website 110 is a website that has been created by a malicious user in an attempt to obtain the credentials of members of the website 100, and thereby obtain unauthorized access their accounts and/or access other functionality of the primary website 100. Generally, the forged website 110 will include a copy 102' of the home page, and potentially other pages as well, such as those pages having credential data fields 108, of the primary website 100 to mislead members of the primary website 100 to use the forged website 110, and enter their user credentials into the credential fields 108' of the forged website 110. The copy 102' need not be an exact duplicate of the page 102, as it is anticipated that a site forger will make certain other changes in the page, for example, to execute on the forged website or for other reasons. Thus, the copy need be only a sufficient facsimile of the home page 102 to mislead users into believing it was the home page 102 of the primary website 100. The forged website 110 will be associated with an unauthorized domain. Continuing the above example, the unauthorized domain could be "www.examplewebsite.com". Of course, these are but simple examples of authorized and unauthorized domains used merely to illustrate the concepts herein, and should not be taken as limiting examples of the variety of possible unauthorized domains.

The primary website 100 includes in the code of its home page 102 (and/or any pages that are likely to be copied by a site forger) executable code 104, which is called herein "domain identification code". This code is client-side executable code, such as client-side JavaScript (or other dialects of ECMAScript), VBScript, and the like. The domain identification code 104 can be embedded directly in the home page 102, or incorporated by include references, or other programmatic methods. The domain identification code 104 is preferably obfuscated using code obfuscation techniques to make difficult for the site forger find and extract or disable. For ease of description herein, it will be assumed that the domain identification code 104 is included in the home page 102, but that is not a requirement of the invention. Accordingly, when the site forger copies pages to create the copied home page 102' as part of the forged website 110, there results a copy 104' of the domain identification code 104 as well.

The domain identification code 104 (and its copy 104', of course) provide certain functionality as next described, which enable the identification of the forged website, as well as allowing for the institution of countermeasures against the forged website 110. This functionality is affected when the home page 102 (or its copy 102') is loaded by the browser 122 (and thus stored in a computer accessible storage device of the client, e.g., memory) and the domain identification code is executed. The primary website 100 includes an authorized server 118, which interacts with the domain identification code 104 to provide various functionality, as further described below. The functionality of the authorized server 118 can be implemented in whole or in part in one server, or in multiple servers.

A first function of the domain identification code 104 is to determine whether it was served to the client device 120 from an authorized domain. In one embodiment, this is done by identifying the domain from which the page 102 is served, and then matching that domain against a list of one or more authorized domains. The domain can be identified from the URL for the page. If the serving domain is found in the list of authorized domains, then the serving domain is authorized; otherwise the serving domain is an unauthorized domain. The list of authorized domains can be included as part of the domain identification code 104, or obtained by request from the primary website 100. Alternatively, the domain identification code 104 can pass the domain name itself to the authorized server 118 for determining whether it is authorized.

When the page containing the domain identification code 104 is served by the primary website 100, the domain identification code 104 will determine that this is an authorized domain, and thereby allow the execution of the home page 102 to continue. However, where the domain identification code 104 is served by the forged website 110, the domain identification code 104 will determine that it is not being served by an authorized domain, and thus that it is being served by an unauthorized domain. The domain identification code 104 then may execute a second function.

A second function of the domain identification code 104 is to provide to the primary website 100 an identification of the unauthorized domain. This can be implemented by a callback from the domain identification code 104 to the authorized server 118 at the primary website 100, including the domain name of the forged website 110 or other identifying information (e.g., IP address). This information can be sent in the clear, or it can be sent in encrypted form, so as to prevent the site forger from seeing that the forged website 110 has been identified. The authorized server 118 receives the identification of the unauthorized domain and can use this information to undertake various actions as countermeasures against the forged website 120 and the site forger.

Figure 3:
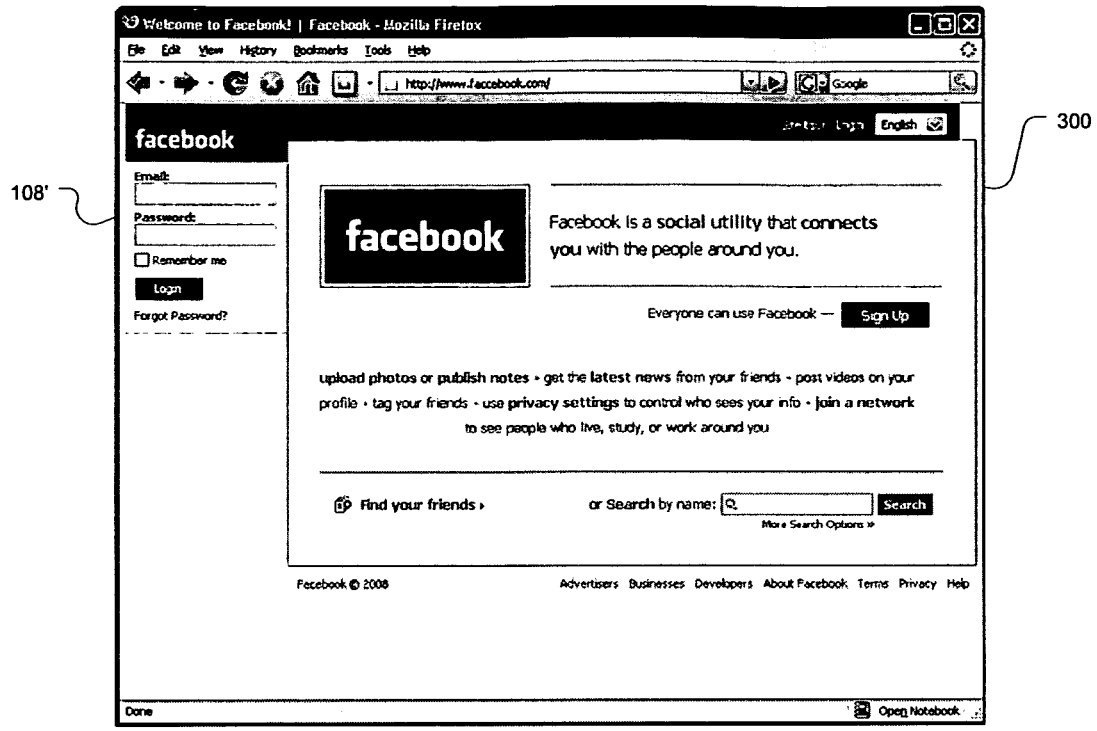
FIG. 3 illustrates a home page of a primary website that has been copied to forged website.
Figure 4:
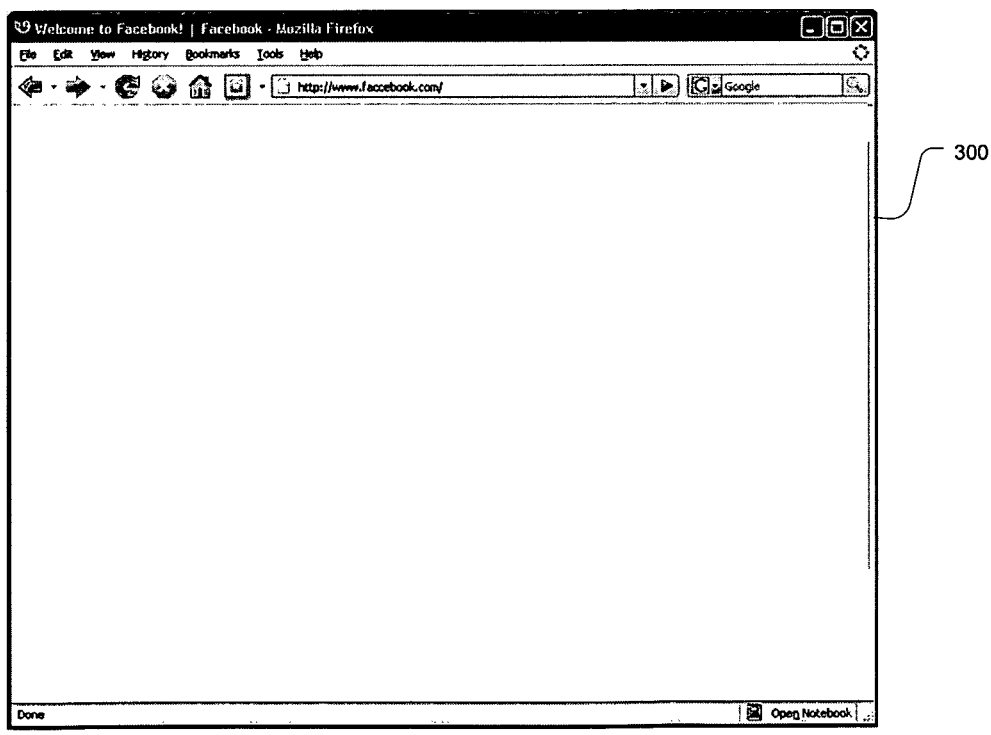
FIG. 4 illustrates the page from a forged website after it has been altered.

Once the domain identification code 104 has determined that it is being served by an unauthorized domain, the browser 122 can execute countermeasures code 109. The countermeasures code 109 can be implemented by code that is included in the home page 102 (or other pages) on the primary website 100, or alternatively by additional client-side executable code that is transmitted to the browser 122 by a server at the primary website 100. Generally, the countermeasures code 109 alters the operation of the page in which it is included, such as copied home page 102'. One way to alter the operation of the copied home page 102' is to modify the appearance of the copied home page 102'. Modifying the appearance can include blanking out the copied home page 102' in whole or in part. FIGS. 3 and 4 illustrates this type of modification. FIG. 3 illustrates a page 300 of a primary website that has been copied and hosted at a forged website at the unauthorized domain "www.faccebook.com". FIG. 4 illustrates this same page after it has been blanked out entirely. The blanked out page can appear on the client device 120 as an empty page such as in FIG. 4 (e.g., against a white, black or other background), for example, or as have various sections missing. Modifying the appearance can include displaying a warning or other notice to the user that they are accessing the forged website 120.

Figure 5:
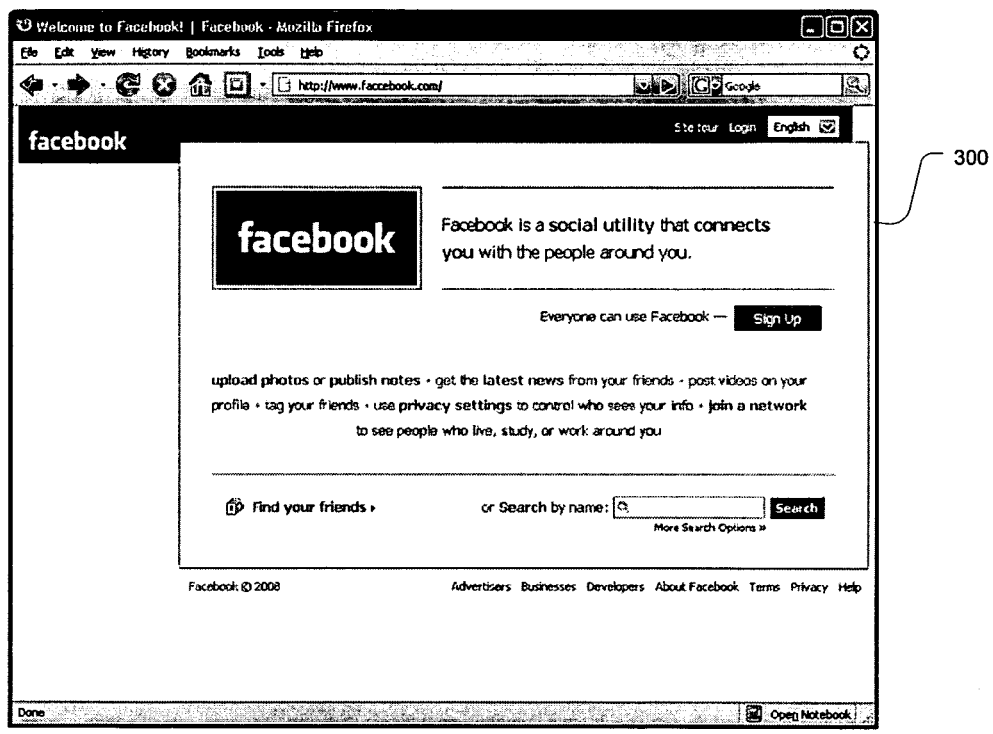
FIG. 5 illustrates the page from a forged website after it has been altered to remove the credential data fields.

Modifying the appearance can also include removing certain elements from the copied home page 102', and in particular can include removing the credential data fields 108'. FIG. 5 illustrates this modification. In FIG. 3, the page 300 initially appeared in the browser 122 as including the credential data fields 108'. FIG. 5 illustrates this same page after the credential fields 108' have been removed. This type of modification prevents the user from providing their credentials to forged website 110, and thus prevents the site forger from using such credentials for malicious purposes. These type of alterations are made by accessing the Document Object Model for the copied home page 102' and modifying (including deleting) the appropriate data elements, such as the body, header, tables, background, and so forth.

Another way to alter the operation of the copied home page 102' is to modify how the copied home page 102' captures of the user's credentials via the credential data fields 108'. This alteration includes providing fake credentials to the forged website 110 via the credential data fields 108'. The fake credentials can be generated programmatically by the countermeasures code 109, or obtained from the primary website 100. The forged website 110 will accept the fake credentials and store them for subsequent usage by the site forger such as sending spam emails to an account associated with the fake credentials, or attempting to access such an account. As the fake credentials are associated with a fake user account, the site forger's actions have no harmful impact on actual members of the primary website 100.

Figure 2:
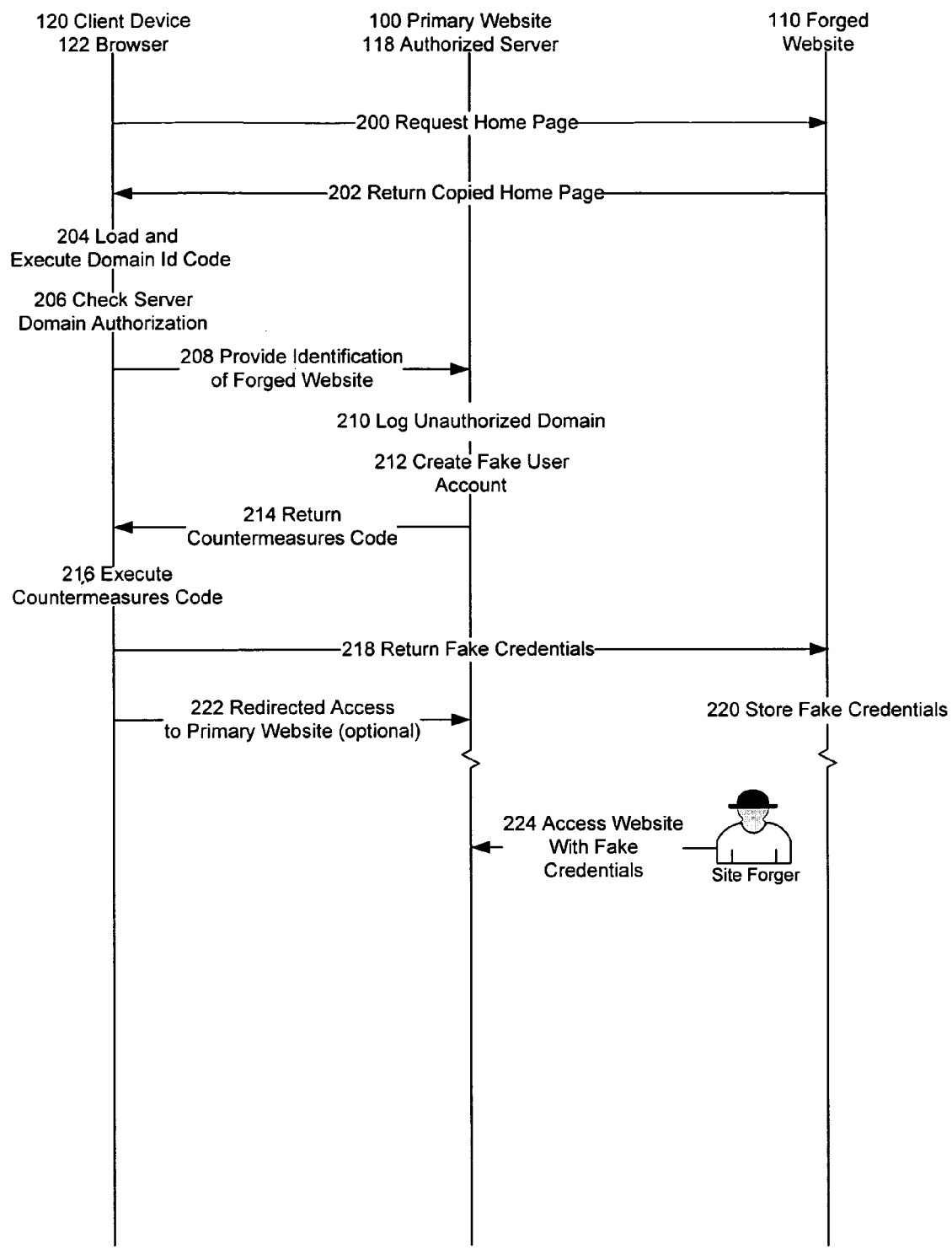
FIG. 2 is event trace in accordance in accordance with one embodiment of the invention.

Referring now to FIG. 2 there is illustrated an event trace of one scenario of events during the operation of the various above described system elements. As a prior condition, it is assumed that the forged website 110 has copied the home page 102 of the primary website 100, including the domain identification code 104', and is hosting that copied page 102' on a web server at an unauthorized domain. The user is further assumed to be attempting to access the primary website 100, but has somehow obtained a URL to the forged website 110 instead, and has entered this URL in the browser 122, which makes a request 200 for the copied home page 102'. Of course, the user does know that he or she has been misled to the forged website 110.

The forged website 110 returns 202 the copied home page 102' including the domain identification code 104' to the browser 122. The browser 122 loads this page and executes 204 the domain identification code 104' (along with any other appropriate client-side code included in the page).

The browser 122 obtains the domain of the server that served the copied home page 102', and determines 206 whether this domain is an authorized domain. As mentioned above, this can be done by comparing the domain to a list of authorized domains. In this scenario, since it is assumed that the page 102' is coming from the forged website 110, the browser 122 determines that serving domain is an unauthorized domain. The browser 122 then sends a message to the authorized server 118 at the primary website 100, providing 208 an identification of the forged website 110, such as its domain name and/or IP address.

The authorized server 118 at primary website 100 logs 210 the unauthorized domain of the forged website. This allows the system administrator at the primary website 100 to take subsequent action against the site forger if need be.

In this scenario, the countermeasures code 109 is configured to return 218 fake user credentials to the forged website 110, via the credential data fields 108'. The authorized server 118 is here configured create 212 a fake user account for these fake credentials; alternatively, the fake credentials can be generated by the countermeasures code 109. The creation of the fake account 212 and user credentials associated therewith can also be done as a preliminary setup set prior to the initial page request 200.

The authorized server 118 then returns 214 the countermeasures code 109 to the browser 122, which then executes 216 this code. As noted above, the countermeasures code 109 can alternatively be included in the copied home page 102' and executed after the browser determines 206 that the forged website 110 is unauthorized. In this alternative embodiment, the authorized server 118 could then be configured to return 214 the fake credentials to the browser 122. In either embodiment, the countermeasures code 109 alters the operation of the copied home page 102' in any of the various ways described above.

In this scenario, the browser 122 returns 218 the fake credentials to the forged website 110, via the data entry fields 108'. The forged website 110 will store 220 these fake credentials. The site forger will subsequently attempt to access 224 the primary website 100 using the fake credentials, for example to send spam message or undertake other malicious actions. If the primary website 100 has created 216 a fake account, the site forger's access is essentially constrained in a harmless way that does not interfere with legitimate members of the primary website 100. If the primary website 100 has not created a fake account, then the site forger's attempted access will simply be denied.

Optionally, the countermeasures code 109 may be further configured to redirect the browser 122 to the primary website 100, so that the user can access the site as they originally intended.

The present invention has been described in particular detail with respect to various possible embodiments. Those of skill in the art will appreciate that the invention may be practiced in other embodiments. First, the particular naming of the components, capitalization of terms, the attributes, data structures, or any other programming or structural aspect is not mandatory or significant, and the mechanisms that implement the invention or its features may have different names, formats, or protocols. Further, the system may be implemented via a combination of hardware and software, as described, or entirely in hardware elements. Also, the particular division of functionality between the various system components described herein is merely exemplary, and not mandatory; functions performed by a single system component may instead be performed by multiple components, and functions performed by multiple components may instead performed by a single component.

Some portions of above description present the features of the present invention in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times, to refer to these arrangements of operations as modules or by functional names, without loss of generality.

Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention could be embodied in software, firmware or hardware, and when embodied in software, could be downloaded to reside on and be operated from different platforms used by real time network operating systems.

The present invention also relates to an apparatus for performing the operations herein. This apparatus may be specially constructed for the required purposes, or it may comprise a general-purpose computer selectively activated or reconfigured by a computer program stored on a computer readable medium that can be accessed by the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and operations presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will be apparent to those of skill in the, along with equivalent variations. In addition, the present invention is not described with reference to any particular programming language. It is appreciated that a variety of programming languages may be used to implement the teachings of the present invention as described herein, and any references to specific languages are provided for disclosure of enablement and best mode of the present invention.

The present invention is well suited to a wide variety of computer network systems over numerous topologies. Within this field, the configuration and management of large networks comprise storage devices and computers that are communicatively coupled to dissimilar computers and storage devices over a network, such as the Internet.

Finally, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which is set forth in the following claims.

The invention claimed is:

1. A computer implemented method comprising:
    receiving a page included in a website at a client device associated with a user, the page having executable scripting code that, when executed by a processor, determines whether a network domain from which the page was served is a domain authorized to serve the page, the determining based at least in part on comparing the network domain from which the page was served with the domain authorized to serve the page;
    responsive to execution of the executable scripting code determining the network domain from which the page was served is not a domain authorized to serve the page, the executable scripting code providing an identification of the domain from which the page was served to an authorized server associated with the domain authorized to serve the page; and responsive to execution of the executable scripting code determining the network domain from which the page was served is not a domain authorized to serve the page, executing countermeasure code included in the page that, when executed by the processor of the client device, modifies operation of the page to prevent phishing of user credentials.

2. The method of claim 1, further comprising:

obtaining fake credentials from the countermeasure code, the fake credentials identifying a fake user account maintained by the authorized server and not associated with the user associated with the client device; and providing the fake credentials from the client device to a server on the network domain from which the page was served that is not a domain authorized to serve the page.

3. The method of claim 1, wherein executing the countermeasures code to modify operation of the page displays the page as an empty page.

4. The method of claim 1, wherein executing the countermeasures code to modify operation of the page removes from the page credential data entry fields.

5. The method of claim 1, wherein executing the countermeasures code to modify operation of the page generates fake credentials and inputs the fake credentials into credential data entry fields in the page.

6. The method of claim 1, wherein the executable scripting code, when executed by a processor, determines whether a network domain from which the page was served is a domain authorized to serve the page by:

providing, from the client device to the authorized server, an identification of the network domain from which the page was served to the client device; and receiving from the authorized server an indication of whether the network domain from which the page was served is authorized to serve the page.

7. The method of claim 1, wherein the executable scripting code that, when executed by a processor, determines whether a network domain from which the page was served is a domain authorized to serve the page by comparing the network domain from which the page was served with a list of at least one authorized domain, and responsive to the network domain from which the page was served not being included in the list, determining that the network domain is an unauthorized domain.

8. A computer implemented method comprising:

receiving at a client device associated with a user a page included in a website, the page having executable scripting code that, when executed by a processor, determines whether a network domain from which the page was served to the client device is a domain authorized to serve the page;

executing the executable scripting code included in the page;

determining at the client device whether the network domain of the server is an authorized network domain for serving the page by the execution of the executable scripting code included in the page, the determining based at least in part on comparing the network domain from which the page was served to the client device with the domain authorized to serve the page;

responsive to the executable scripting code included in the page determining the network domain from which the page was served is not authorized to serve the page, the executable scripting code providing an identification of the domain that is not authorized to serve the page to an authorized server associated with the domain authorized to serve the page; and responsive to the executable scripting code included in the page determining the network domain from which the page was served is not authorized to serve the page, executing countermeasure code included in the page that, when executed by the processor of the client device, modifies operation of the page received from the domain that is not authorized to serve the page, to prevent phishing of user credentials.

9. The method of claim 8, further comprising:

providing from the client device fake user credentials to a server associated with the domain that is not authorized to serve the page, the fake user credentials associated with a fake user account on the authorized server distinct from an account associated with the user.

10. The method of claim 9, wherein the fake user credentials are received from the authorized server.

11. The method of claim 9, wherein the fake user credentials are generated by the client device by executing countermeasure code included in the page.

12. The method of claim 8, wherein the executable scripting code that, when executed by a processor, determines whether a network domain from which the page was served to the client device is a domain authorized to serve the page by:

comparing the network domain from which the page was served with a list of at least one authorized domains included in the executable scripting code, and responsive to the network domain from which the page was served not being included in the list, determining that the network domain from which the page was served is not authorized to serve the page.

13. The method of claim 8, wherein the executable scripting code, when executed by a processor, determines whether a network domain from which the page was served to the client device is a domain authorized to serve the page by:

transmitting an indication of the network domain from which the page was served to the authorized server; and receiving an indication from the authorized server whether the network domain is authorized to serve the page.

14. A computer program product, stored in a non-transitory computer readable storage medium, the program product comprising:

data describing one or more credential data entry fields for display via a web page; and executable scripting code that, when executed by a processor, cause the processor to:

determine whether a network domain from which the web page was served to the client device is a domain authorized to serve the web page, the determining based at least in part on comparing the network domain from which the page was served with the domain authorized to serve the page;

responsive to determining the network domain from which the web page was served to the client device is not a domain authorized to serve the web page, the executable scripting code providing an identification of the domain from which the web page was served to an authorized server associated with a domain authorized to serve the web page; and responsive to determining the network domain from which the web page was served to the client device is not a domain authorized to serve the web page, executing countermeasure code included in the web page that, when executed by the processor, modifies operation of the web page received from the domain that is not authorized to serve the page.

15. The computer program product of claim 14, wherein executing the countermeasure code included in the web page, causes the web page to be displayed as an empty page.

16. The computer program product of claim 14, wherein executing the countermeasure code included in the web page causes removal of the one or more credential data entry fields from the web page.

17. The computer program product of claim 14, wherein executing the countermeasure code included in the web page causes generation of fake credentials and entry of the fake credentials into the one or more credential data entry fields in the web page.

18. The computer program product of claim 14, wherein the executable scripting code, when executed by the processor, causes the processor to determine whether the network domain from which the web page was served to the client device is the domain authorized to serve the web page by comparing the network domain from which the web page was served with a list of at least one authorized domain, and responsive to the network domain from which the web page was served not being included in the list, determine that the network domain from which the web page was served is an unauthorized domain.

19. The computer program product of claim 14, wherein the executable scripting code, when executed by the processor, causes the processor to determine whether the network domain from which the web page was served to the client device is the domain authorized to serve the web page by providing an identifier of the network domain from which the web page was served to the authorized server, and receiving an indication from the authorized server whether the network domain from which the web page was served is an authorized network domain.

20. A computer system, comprising:
a web server computer system including a processor, adapted to communicate with a client device including a web browser; and
a data storage system coupled to the web server computer system, the data storage system storing a website including a page, the page:
  having executable scripting code that when executed by the client device, causes the client device to determine whether the network domain from which the page was served to the client device is a domain authorized to serve the page, the determining based at least in part on comparing the network domain from which the page was served to the client device with the domain authorized to serve the page, and responsive to the network domain from which the page was served not being authorized to serve the page, provides an identification of the network domain from which the page was served to an authorized server associated with a network domain authorized to serve the page, and
  responsive to determining the network domain from which the page was served to the client device is not a network domain authorized to serve the page, executing countermeasure code included in the page that, when executed, modifies operation of the web page received from the network domain that is not authorized to serve the page.

21. The system of claim 20, further comprising:
the authorized server, coupled to the web server computer system, configured to receive the identification from the client device of the networking domain from which the page was served and to transmit to the client device executable code that, when executed by the client device, modifies the page served from the network domain not authorized to serve the page to prevent the page from transmitting user credentials associated with a user of the client device to the network domain from which the page was served.

\* \* \* \* \*